United States Patent
Metange

(10) Patent No.: US 12,525,131 B2
(45) Date of Patent: Jan. 13, 2026

(54) GROUND AIR TRAFFIC MONITORING UNDER LOW VISIBILITY CONDITIONS USING AUGMENTED REALITY (USING HEAD-MOUNTED DISPLAY)

(71) Applicant: Rockwell Collins, Inc., Cedar Rapids, IA (US)

(72) Inventor: Ananta Gopal Metange, Akola (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 165 days.

(21) Appl. No.: 18/388,310

(22) Filed: Nov. 9, 2023

(65) Prior Publication Data
US 2024/0331550 A1    Oct. 3, 2024

(30) Foreign Application Priority Data
Mar. 29, 2023    (IN) .............. 202311023105

(51) Int. Cl.
| G08G 5/22 | (2025.01) |
| G02B 27/01 | (2006.01) |
| G06T 19/00 | (2011.01) |
| G08G 5/72 | (2025.01) |

(52) U.S. Cl.
CPC .............. *G08G 5/22* (2025.01); *G02B 27/017* (2013.01); *G06T 19/006* (2013.01); *G08G 5/727* (2025.01)

(58) Field of Classification Search
CPC ............ G08G 5/22; G08G 5/727; G08G 5/21; G08G 5/26; G08G 5/723; G02B 27/017; G06T 19/006
See application file for complete search history.

(56) References Cited

U.S. PATENT DOCUMENTS

| 7,129,887 B2 | 10/2006 | Mitchell |
| 2005/0231419 A1 | 10/2005 | Mitchell |
| 2010/0002077 A1 | 1/2010 | Viggiano et al. |
| 2016/0127690 A1* | 5/2016 | Kaehler ................ G06V 20/52 348/143 |
| 2020/0050217 A1* | 2/2020 | Rose ...................... H04N 7/181 |

FOREIGN PATENT DOCUMENTS

KR    20230036428 A *    3/2023    .............. G08G 5/70

OTHER PUBLICATIONS

Ronald Reisman and Stephen Ellis, Augmented Reality for Air Traffic Control Towers, 2003, In ACM SIGGRAPH 2003 Sketches & Applications, pp. 1-1. (Year: 2003).*
European Search Report received in EP Application No. 24168099.0, Jul. 9, 2024, 10 pages.

* cited by examiner

*Primary Examiner* — Jeffery A Brier
(74) *Attorney, Agent, or Firm* — Suiter Swantz IP

(57) ABSTRACT

An augmented reality system in an air traffic control tower receives data from multiple airfield sensors and from local aircraft and correlates the data in space and time. Features of the airfield are rendered visually in an augmented reality headset during low visibility conditions. The augmented reality system renders visualizations of aircraft and may render data from the aircraft to coincide with the visualizations. The augmented reality system may receive data from systems within the air traffic control tower, commonly rendered on displays in the air traffic control tower and rendered such data within the augmented reality display.

14 Claims, 3 Drawing Sheets

GROUND AIR TRAFFIC MONITORING UNDER LOW VISIBILITY CONDITIONS USING AUGMENTED REALITY (USING HEAD-MOUNTED DISPLAY)

PRIORITY

The present application claims the benefit under 35 U.S.C. § 119(a) of Indian patent application Ser. No. 20/231,1023105 (filed Mar. 29, 2023), which is incorporated herein by reference.

BACKGROUND

Managing ground air traffic at the airports under low visibility conditions, because of fog, rain, insufficient lighting, and long distances, is a challenge. In existing systems, the air traffic control operators rely on vision, binoculars, and cameras which are placed in the airfields (airport runways etc.) to spot, locate, and track aircraft. Such visual mechanisms allow only partially unclear views under low visibility conditions, and also imposes high "head down time" for the air traffic control operator.

Currently, airport operations under low visibility conditions are based on procedures and working methods with limited or no automation support. It would be advantageous to have a system and method for enhancing visibility within the air traffic control tower under low visibility conditions.

SUMMARY

In one aspect, embodiments of the inventive concepts disclosed herein are directed to an augmented reality system in an air traffic control tower. The augmented reality system receives data from multiple airfield sensors and from local aircraft and correlates the data in space and time. Features of the airfield are rendered visually in an augmented reality headset during low visibility conditions.

In a further aspect, the augmented reality system renders visualizations of aircraft and may render data from the aircraft to coincide with the visualizations.

In a further aspect, the augmented reality system may receive data from systems within the air traffic control tower, commonly rendered on displays in the air traffic control tower and rendered such data within the augmented reality display.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
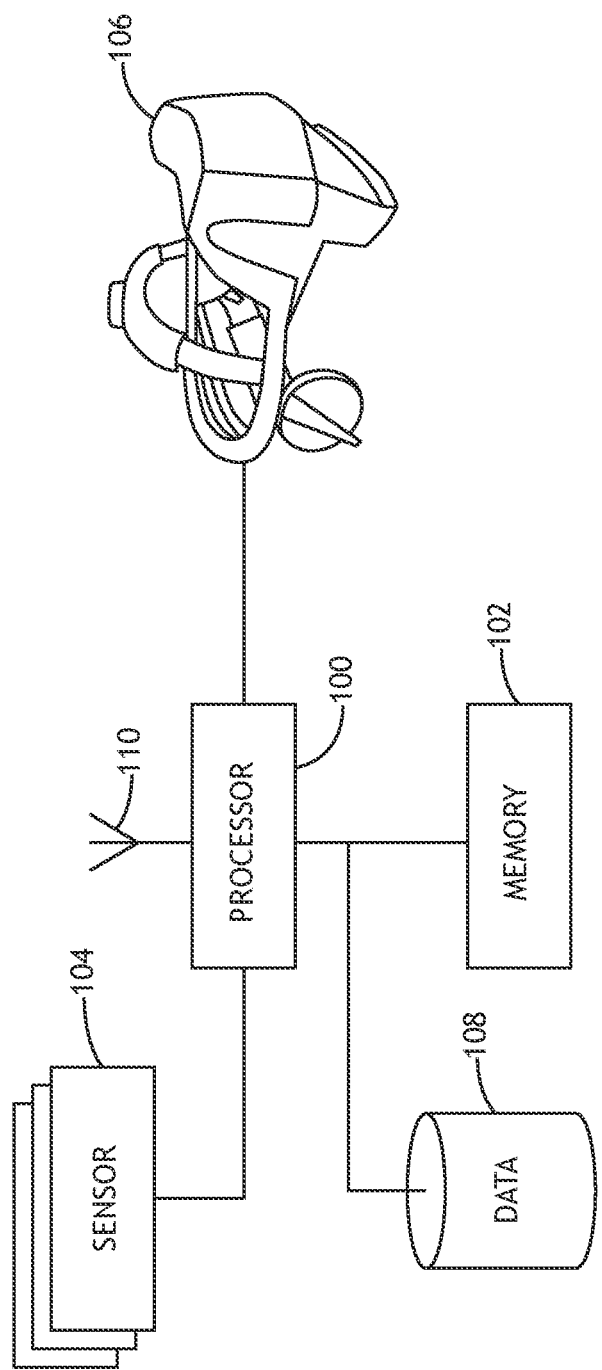
FIG. 1 shows a block diagram of a system according to an exemplary embodiment.

Before explaining various embodiments of the inventive concepts disclosed herein in detail, it is to be understood that the inventive concepts are not limited in their application to the arrangement of the components or steps, or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present), and B is false (or not present), A is false (or not present), and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to an augmented reality system in an air traffic control tower. The augmented reality system receives data from multiple airfield sensors and from local aircraft and correlates the data in space and time. Features of the airfield are rendered visually in an augmented reality headset during low visibility conditions. The augmented reality system renders visualizations of aircraft and may render data from the aircraft to coincide with the visualizations. The augmented reality system may receive data from systems within the air traffic control tower, commonly rendered on displays in the air traffic control tower and rendered such data within the augmented reality display.

Referring to FIG. 1, a block diagram of a system according to an exemplary embodiment is shown. The system includes at least one processor 100, memory 102 connected to the processor 100 to embody processor executable code, a plurality of sensors 104 in data communication with the processor 100, and an AR enabled headset display 106 in data communication with the processor 100. The processor 100 receives data from the plurality of sensors 104 locates the data in space based on known locations and orientations of the corresponding sensors 104. For example, a first vision-based sensor 104 (camera) may track an aircraft (i.e., via object recognition algorithms) from a first known location and known observation angle while a second vision-based sensor 104 may track the aircraft from a second known location and known observation angle. The processor 100 may receive such data and correlate each data point to locate those data points in space.

In at least one embodiment, the processor 100 may access a stored model of an airfield, including taxiways, runways, locations of sensors 104, and a location of the user/AR enabled headset display 106 (i.e., an air traffic control tower) from a data storage element 108 in data communication with the processor 100. The processor 100 may locate data points in space relative to the stored model based on known locations of landmarks in the stored model and observations of those landmarks by the sensors 104. Furthermore, the processor 100 may render the model of the airfield in the AR enabled headset display 106 for clarity during periods of reduced visibility. For example, the processor 100 may render high-visibility outlines of airfield features, superimposed over the actual features in the AR enabled headset display 106.

In at least one embodiment, the system may include a data connection element 110 in data communication with the processor 100. The processor 100 may receive data from aircraft; such data may include the location, direction of travel, and status of the aircraft. The processor 100 may correlate such data with data points received from the plurality of sensors 104. In at least one embodiment, the processor 100 may access stored models corresponding to the aircraft sending data to the data connection element 110.

Having received and correlated data from the plurality of sensors 104 and potentially from aircraft via the data connection element 110, the processor 100 renders graphical representations of the data on the AR enabled headset display 106. Such graphical representations may include rendering stored models of aircraft to correspond to the real-world location of the aircraft as seen from the perspective of the user with necessary scaling and transformation. In at least one embodiment, the graphical representations may be derived from real-time data streams from the sensors 104, 106. For example, the processor 100 may employ object recognition algorithms to identify an aircraft in an image stream and map the image of the aircraft to an aircraft model based on identifiable landmarks in the image stream.

The user has access to local informational display. In at least one embodiment, the processor 100 may receive such data via the data connection element 110 and render such data in the AR enabled headset display 106. For example, the processor 100 may render such data in a format substantially similar to the local informational displays (i.e., visually similar renders maintained in the user's field of vision). Alternatively, or in addition, the processor 100 may superimpose such data over corresponding aircraft within the user's field of view.

In at least one embodiment, the processor 100 may apply a threshold of visibility to determine when to render certain elements in the AR enabled headset display 106. For example, the processor 100 may determine that local visibility is below some threshold based on sensor images where the processor 100 may observe certain landmarks and thereby gauge local observability.

Figure 2:
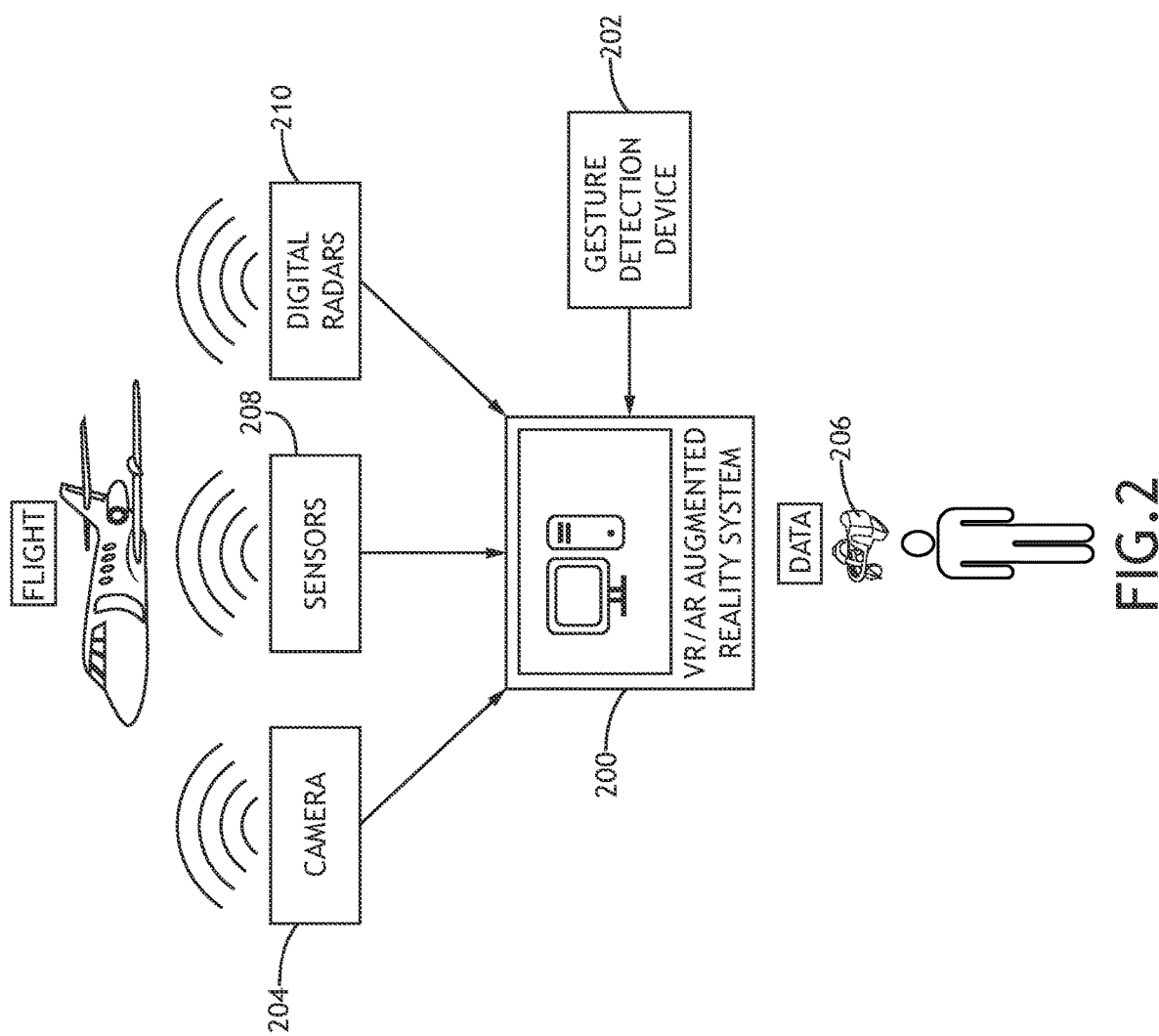
FIG. 2 shows a block diagram of a system according to an exemplary embodiment.

Referring to FIG. 2, a block diagram of a system according to an exemplary embodiment is shown. The system includes a VR/AR system 200 configured to render a simulated air traffic control tower environment on a VR/AR enabled headset 206. The simulation embodies a real out-the-window view. The VR/AR system 200 constructs the real out-the-window view based on vision-based sensors 204, non-vision-based sensors 208, radars 210, predefined aircraft and airfield models, data received from aircraft, etc. Each datapoint may include location data specific to the source of the data to allow the VR/AR system 200 to correlate data in space. Furthermore, each datapoint may be timestamped to allow the VR/AR system 200 to correlate the data in time.

The system may include a motion tacking/gesture tracking element 202 (e.g., a Flock-of-Birds tracker device) to augment visual perception. AR in the air traffic control tower environments supports the air traffic controller by blending in real-time computer-generated data (virtual reality) into the real-world view. In at least one embodiment, the VR/AR enabled headset 206 comprises a dual-display see-through Head-Mounted-Display (HMD). The HMD position and attitude are tracked with high precision to enable the VR/AR system 200 to superimpose a bright virtual image across the field-of-view. The superimposed image can be static data (e.g., arbitrary flight strip information) or information which depends on the direction of view (e.g., direction finder information, flight strip information filtered based on the direction of view, label information attached to the visual presentation of an aircraft, or the like).

Figure 3:
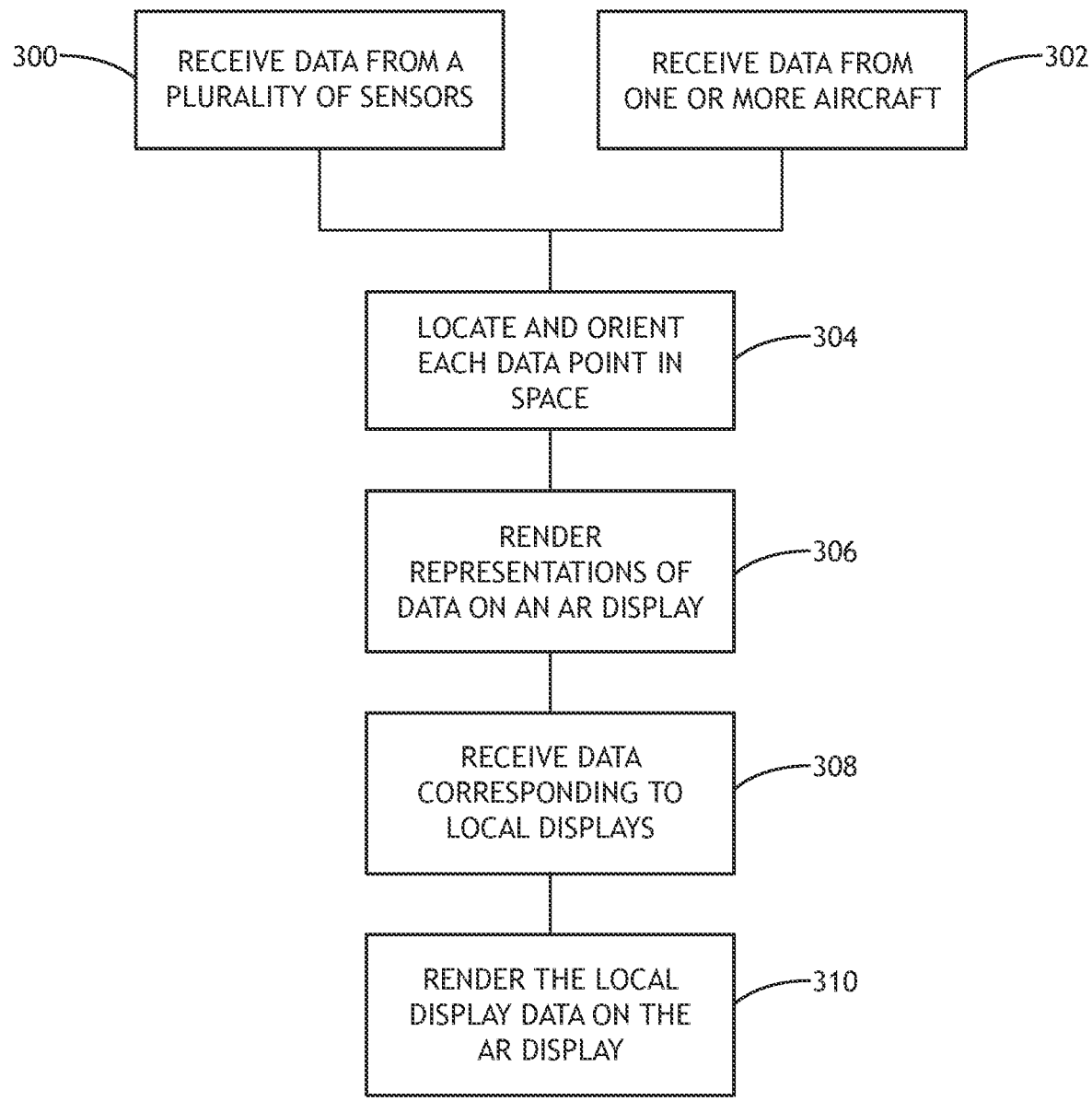
FIG. 3 shows a flowchart of a method according to an exemplary embodiment.

Referring to FIG. 3, a flowchart of a method according to an exemplary embodiment is shown. A VR/AR system in an air traffic control tower includes a processor that receives 300 data from a plurality of sensors, at least some of which are disposed at known locations in the airfield. The processor also receives 302 data from one or more aircraft, including location data and status data associated with the aircraft.

The processor locates 304 and orients each datapoint in space and time based on location metadata and timestamp data, the known locations of the sensors, the known locations of landmarks in sensor image streams, etc. Once all of the datapoints are located in space, the processor renders 306 representations of the datapoints in an AR enabled headset display. Such renderings may include elements to highlight features of the airfield and aircraft and/or full graphical renderings of such features and aircraft. Furthermore, the processor may determine a level of graphical intervention based on a gauge of local visibility conditions.

In at least one embodiment, the processor may receive 308 data corresponding to local displays in the air traffic control tower and render 310 such information in the AR enabled headset display. In at least one embodiment, the processor may render such data within the AR enabled headset display to generally correspond to the same display in the air traffic control tower to facilitate air traffic controller comprehension. Alternatively, or in addition, the data may be rendered to associate the data with a specific aircraft where appropriate.

Embodiments of the present disclosure enable better visibility and tracking of flights on fields under low visibility conditions and reduced "head down time" between the primary visual field (i.e., out the tower window), and an auxiliary tool (e.g., paper, electronic flight strips, surface movement radar, etc.). Consolidating multiple data streams into a single AR display may reduce the number of screens in the air traffic control tower; the air traffic control digital wall may be avoided as the information is being made available on a head-mounted display at a reduced cost.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. An augmented reality computer apparatus comprising:
an augmented reality (AR) enabled headset display; and
at least one processor in data communication with the AR enabled headset display and a memory storing processor executable code for configuring the at least one processor to:
receive a plurality of data streams, each corresponding to an airfield sensor;
receive data from one or more aircraft;
receive data corresponding to one or more local air traffic control displays;
correlate the data streams and data from the one or more aircraft based on location and timestamp metadata, and known locations of the airfield sensors;
render, in the AR enabled headset display, a graphical representation of an airfield and the one or more aircraft based on the plurality of data streams and data from the one or more aircraft;
determine if the one or more local air traffic control displays are not within a field of view of the AR enabled headset display; and
render the data corresponding to one or more local air traffic control displays in the AR enabled headset display when the one or more local air traffic control displays are not within the field of view.

2. The apparatus of claim 1, further comprising a data storage element including a model of the airfield, wherein:
the at least one processor is further configured to locate the graphical representations with respect to the model; and
rendering the graphical representation of the airfield comprises rendering the model.

3. The apparatus of claim 2, wherein:
the data storage element includes models of aircraft; and
rendering the graphical representations of the one or more aircraft comprises rendering an aircraft model.

4. The apparatus of claim 1, wherein the at least one processor is further configured to map the data corresponding to one or more local air traffic control displays to a corresponding aircraft.

5. The apparatus of claim 1, wherein the at least one processor is further configured to determine a level of visibility based on at least one of the data streams.

6. An augmented reality air traffic control system comprising:
an augmented reality (AR) enabled headset display,
a plurality of sensors disposed at known locations on an airfield; and
at least one processor in data communication with the plurality of sensors, the AR enabled headset display, and a memory storing processor executable code for configuring the at least one processor to:
receive a plurality of data streams, each corresponding to one of the pluralities of sensors;
receive data from one or more aircraft;
receive data corresponding to one or more local air traffic control displays;
correlate the data streams and data from the one or more aircraft based on location and timestamp metadata, and known locations of each of the plurality of sensors;
render, in the AR enabled headset display, a graphical representation of an airfield and the one or more aircraft based on the plurality of data streams and data from the one or more aircraft;
determine if the one or more local air traffic control displays are not within a field of view of the AR enabled headset display; and
render the data corresponding to one or more local air traffic control displays in the AR enabled headset display when the one or more local air traffic control displays are not within the field of view.

7. The system of claim 6, further comprising a data storage element including a model of the airfield, wherein:
the at least one processor is further configured to locate the graphical representations with respect to the model; and
rendering the graphical representation of the airfield comprises rendering the model.

8. The system of claim 7, wherein:
the data storage element includes models of aircraft; and
rendering the graphical representations of the one or more aircraft comprises rendering an aircraft model.

9. The system of claim 6, wherein the at least one processor is further configured to map the data corresponding to one or more local air traffic control displays to a corresponding aircraft.

10. The system of claim 6, wherein the at least one processor is further configured to determine a level of visibility based on at least one of the data streams.

11. A method for enhancing a low visibility airfield in an air traffic control tower comprising:
receiving a plurality of data streams, each corresponding to an airfield sensor;
receiving data from one or more aircraft;
determining if a level of visibility is below a predefined threshold based on at least one of the data streams;
correlating the data streams and data from the one or more aircraft based on location and timestamp metadata, and known locations of the airfield sensors;
rendering, in an AR enabled headset display, a graphical representation of the airfield and the one or more aircraft based on the plurality of data streams and data from the one or more aircraft when the level of visibility is below the predefined threshold.

12. The method of claim 11, further comprising locating the graphical representations with respect to an airfield model, wherein rendering the graphical representation of the airfield comprises rendering the airfield model.

13. The method of claim 12, wherein rendering the graphical representations of the one or more aircraft comprises rendering an aircraft model.

14. The method of claim 11, further comprising:
  receiving data corresponding to one or more local air traffic control displays; and
  rending the data corresponding to one or more local air traffic control displays in the AR enabled headset display.

* * * * *